(12) United States Patent
Momiuchi et al.

(10) Patent No.: US 7,309,168 B2
(45) Date of Patent: Dec. 18, 2007

(54) OPTICAL FIBER CABLE

(75) Inventors: Masayuki Momiuchi, Itabashi-ku (JP); Shinya Ikoma, Itabashi-ku (JP); Shigenori Nagano, Itabashi-ku (JP); Akira Takada, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/635,328

(22) Filed: Dec. 7, 2006

(65) Prior Publication Data

US 2007/0147742 A1    Jun. 28, 2007

(30) Foreign Application Priority Data

Dec. 22, 2005    (JP) ............................. 2005-370675

(51) Int. Cl.
*G02B 6/36* (2006.01)

(52) U.S. Cl. ............................. 385/78; 385/76; 385/77; 385/100; 385/95; 385/96; 385/99

(58) Field of Classification Search .................. 385/14, 385/53, 55, 57, 73, 74, 77, 78, 76, 79, 89, 385/95, 96, 97, 98, 99, 100, 102, 31, 33

See application file for complete search history.

(56) References Cited

U.S. PATENT DOCUMENTS

| | | | | |
|---|---|---|---|---|
| 4,544,234 A | * | 10/1985 | DeVeau et al. | 385/98 |
| 4,648,892 A | * | 3/1987 | Kittrell et al. | 65/387 |
| 4,919,510 A | * | 4/1990 | Hoke et al. | 385/95 |
| 6,519,406 B1 | * | 2/2003 | Fukuyama et al. | 385/137 |
| 6,752,537 B2 | * | 6/2004 | Clarkin et al. | 385/78 |
| 6,931,194 B2 | * | 8/2005 | Dowd et al. | 385/135 |
| 2002/0110332 A1 | * | 8/2002 | Clarkin et al. | 385/78 |
| 2003/0016922 A1 | * | 1/2003 | DeMartino et al. | 385/98 |

FOREIGN PATENT DOCUMENTS

JP    2007-041512    2/2007    ............. 385/3.1 X

* cited by examiner

*Primary Examiner*—Brian M. Healy
(74) *Attorney, Agent, or Firm*—Nields & Lemack (57) ABSTRACT

An optical fiber cable, comprising a cable main unit with an optical fiber covered by a sheath and terminal units mounted on end portions of the cable main unit, wherein each of the terminal units has a transparent cover member with a refractive index approximately equal to the optical fiber, the cover member of at least one of the terminal units and the optical fiber are welded under such condition that the cover member is brought closer to or into contact with the optical fiber, and the cover member and the optical fiber are integrated with each other.

9 Claims, 6 Drawing Sheets

OPTICAL FIBER CABLE

BACKGROUND OF THE INVENTION

The present invention relates to an optical fiber cable to be used as a transmission medium for optical communication in communication and measurement, and also as a transmission medium for optical energy in product fabrication, medical purpose, etc.

In recent years, the use of a light and a laser beam as a communication medium and as an energy medium has been increasingly spread, and rapid progress has been made in the development of an optical fiber cable as a transmission medium to guide the light and the laser beam.

Figure 5:
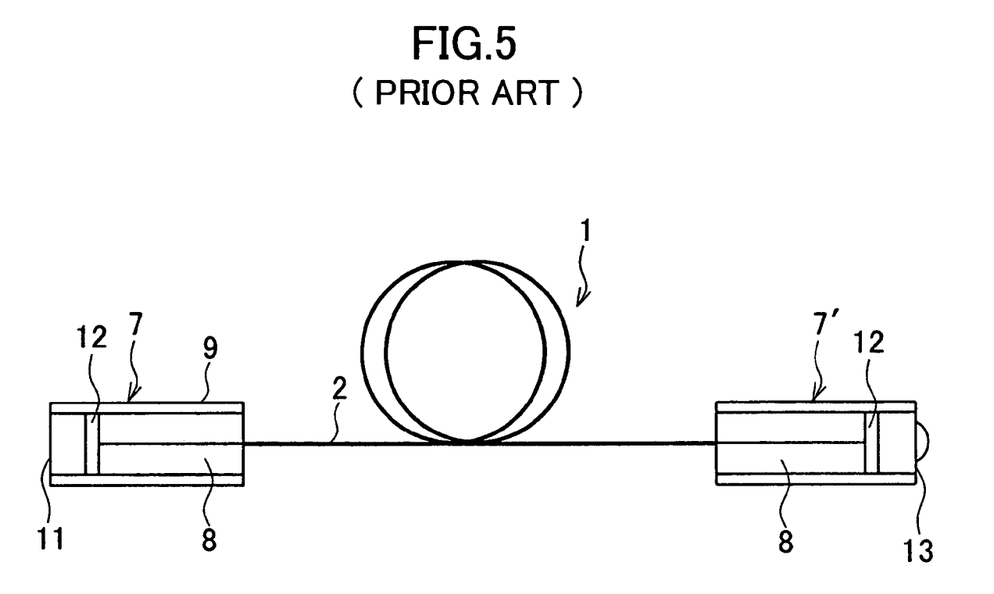
FIG. 5 is a partial sectional view of a conventional type optical fiber cable.
Figure 6:
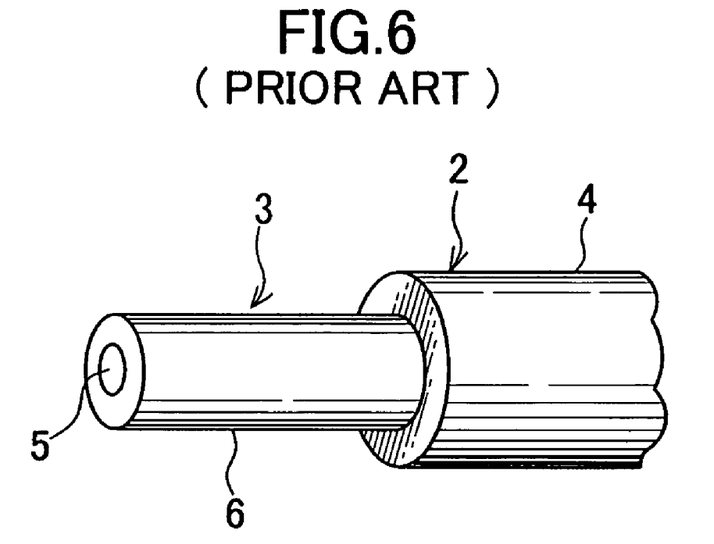
FIG. 6 is a drawing to show a general structure of a cable main unit.

Referring to FIG. 5 and FIG. 6, description will be given on general structure of the optical fiber cable.

An optical fiber cable 1 comprises a cable main unit 2 and cable terminal units 7 and 7' to be attached on end portions of the cable main unit 2. The cable main unit 2 comprises an optical fiber 3 and a sheath 4 to cover the optical fiber 3 and to protect the optical fiber 3. The optical fiber 3 further comprises a core 5 with high refractive index at its center and a clad 6 with low refractive index to enclose the circumference of the core 5. As the material of the core 5 and the clad 6, silica glass (quartz glass) is primarily used.

Figure 7:
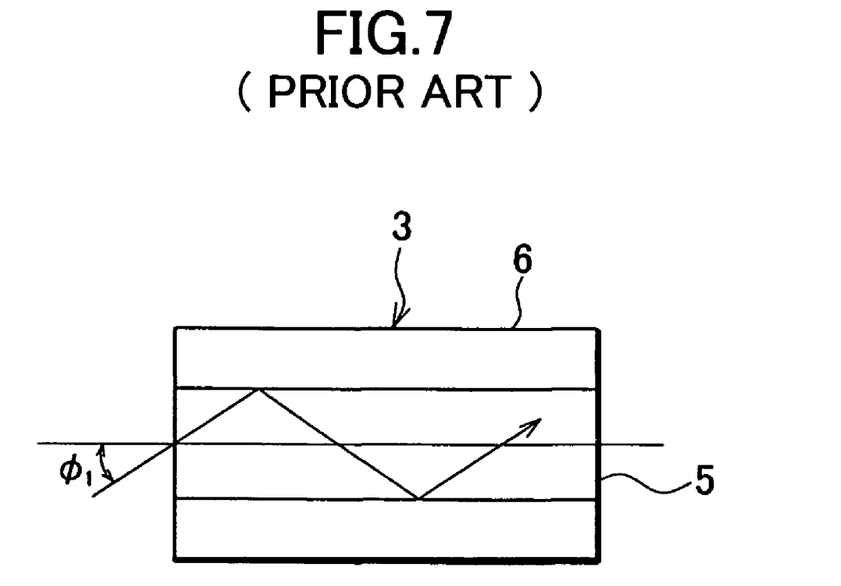
FIG. 7 is a schematical diagram to show a relation between an optical fiber and advancing of a light.

As shown in FIG. 7, when a light enters an end surface of the core 5 at an incident angle $\phi$, the incident angle at boundary surface between the core 5 and the clad 6 is increased to a value bigger than a critical angle, which is determined by a difference between the refractive indices of the core and the clad. Then, the light is reflected in total reflection by the boundary surface, and the light propagates inside the core 5.

The cable terminal units 7 and 7' are attached on end portions of the cable main unit 2. The optical fibers 1 are connected with each other by connecting the cable terminal unit 7 or the cable terminal unit 7' to a connector (not shown). In case of parallel luminous fluxes, a collimator lens is used as the cable terminal unit 7'. In case of converged luminous fluxes, a parallel plate is used as the cable terminal unit 7. When the optical fiber cable 1 is connected to a distributor, an amplifier, etc. (not shown), the cable terminal units 7 and 7' are connected to a distributor, an amplifier, etc. respectively.

Now, description will be given on the cable terminal units 7 and 7'.

The sheath 4 is removed for a certain required length at a forward end of the cable main unit 2. The optical fiber is exposed, and a ferrule 8 is attached on the exposed portion of the optical fiber 3. With the ferrule 8 attached on the optical fiber 3, an end surface of the optical fiber 3 is polished together with the ferrule 8. After polishing, an antireflection film (not shown) is formed on the end surface. The end surface of the optical fiber 3 is polished integrally with the ferrule 8 for the purpose of compensating the insufficient strength of the optical fiber 3 by the ferrule 8.

A terminal unit cover 9 is attached on the ferrule 8. On a forward end of the terminal unit cover 9, a cover glass 11 is mounted, and a gap 12 is provided as required between the cover glass 11 and the forward end of the optical fiber 3. An antireflection film (not shown) is formed on both of the end surfaces of the cover glass 11.

On the cable terminal unit 7', a collimator lens 13, which has an end surface designed as a convex surface and an effect of a lens, is used instead of the cover glass 11. On both of the end surfaces of the collimator lens 13, antireflection films are formed respectively. When the collimator lens 13 is provided, the light projected from the cable main unit 2 is turned to parallel luminous fluxes. Or, the light transferred from the collimator lens 13 is converged to the core 5 of the cable main unit 2.

In the conventional type optical fiber cable as described above, when the cable terminal units 7 and 7' are mounted on the cable main unit 2, the end surfaces must be polished in order to reduce optical loss such as the loss caused by irregular reflection on the cable main unit 2. Further, for the purpose of reducing the optical loss caused by the reflection on the end surfaces, the antireflection film must be provided. Also, the antireflection film is required also for the purpose of reducing the optical loss caused by reflection on the end surfaces of the cover glass 11 and the collimator lens 13.

In the treatment to fabricate the end portion of the cable main unit 2 in the conventional type optical fiber cable as described above, the end surface of the cable main unit 2 must be polished and the antireflection film must be prepared to mount the cable terminal unit 7 on the cable main unit 2. Also, the antireflection film must be prepared on the cover glass 11 and the collimator lens 13. Thus, many processes are needed for the treatment, and much time and cost are required.

When the collimator lens 13 is arranged on the cable terminal unit 7', in order to turn the light projected from the collimator lens 13 to parallel luminous fluxes, there must be strict positional relation in a direction of the optical axis between the end surface of the cable main unit 2 and the collimator lens 13, and accurate positioning must be performed between the end surface of the cable main unit 2 and the collimator lens 13 (i.e. adjustment of opening dimension of the gap 12). For this reason, troublesome and burdensome procedure is required for maintaining accurate dimension of the gap 12 formed between the ferrule 8 and the collimator lens 13 and for mounting the terminal unit cover 9.

SUMMARY OF THE INVENTION

It is an object of the present invention to provide an optical fiber cable, by which it is possible to reduce the manufacturing cost and to manufacture the optical fiber cable in easy and simple manner.

To attain the above object, the present invention provides an optical fiber cable, which comprises a cable main unit with an optical fiber covered by a sheath and terminal units mounted on end portions of the cable main unit, wherein each of the terminal units has a transparent cover member with a refractive index approximately equal to the optical fiber, the cover member of at least one of the terminal units and the optical fiber are welded under such condition that the cover member is brought closer to or into contact with the optical fiber, and the cover member and the optical fiber are integrated with each other. Also, the present invention provides the optical fiber cable as described above, wherein the cover member is covered by a terminal unit cover, and the cable main unit and the cover member are fixed by the terminal unit cover. Further, the present invention provides the optical fiber cable as described above, wherein the sheath is removed for a required length from the end portion of the cable main unit and the optical fiber is exposed, the exposed optical fiber is inserted into a ferrule, and an end surface of the optical fiber which pierces is welded on the cover member. Also, the present invention provides the optical fiber cable as described above, wherein the terminal unit cover is stretched over to cover the cover member and the ferrule. Further, the present invention provides the optical fiber cable as described above, wherein a forward end surface of said optical fiber to be welded is a cleaved surface. Also, the present invention provides the optical fiber cable as described above, wherein a portion around a forward end of the optical fiber welded is strengthened by using an adhesive agent. Further, the present invention provides the optical fiber cable as described above, wherein the optical fiber and the cover member have different softening points and different melting points, the softening point and the melting point of the cover member are lower than the softening point and the melting point of the optical fiber, and welding are performed by softening and melting the cover member. Also, the present invention provides the optical fiber cable as described above, wherein an input end surface of the cover member is designed in form of a lens to refract an input light and guides the input light directly toward the optical fiber. Further, the present invention provides the optical fiber cable as described above, wherein a diffraction grating is provided on an output end surface of the cover member to diffract an output light.

According to the present invention, in an optical fiber cable, which comprises a cable main unit with an optical fiber covered by a sheath and terminal units mounted on end portions of the cable main unit, each of the terminal units has a transparent cover member with a refractive index approximately equal to the optical fiber, the cover member of at least one of the terminal units and the optical fiber are welded under such condition that the cover member is brought closer to or into contact with the optical fiber, and the cover member and the optical fiber are integrated with each other. As a result, there is no gap between the optical fiber end surface and the cover member. This eliminates optical loss caused by damage or reflection on the end surface and contributes to the improvement of light transmission efficiency. Further, the processes to polish the end surface of the optical fiber, to form the antireflection film, and so on can be eliminated, and the manufacturing cost can be reduced.

Also, according to the present invention, a forward end surface of the optical fiber to be welded is a cleaved surface. Thus, the processing of the end surface for welding can be eliminated, and the welding procedure can be simplified.

Further, according to the present invention, a portion around a forward end of the optical fiber being welded is strengthened by using an adhesive agent. As a result, the reliability and the durability performance of the welding operation can be increased.

Also, according to the present invention, the optical fiber and the cover member have different softening points and different melting points, the softening point and the melting point of the cover member are lower than the softening point and the melting point of the optical fiber, and welding are performed by softening and melting the cover member. This makes it possible to prevent the change of optical positions of the optical fiber and the cover member because the position of the end surface of the optical fiber is not changed after the welding operation.

BRIEF DESCRIPTION OF THE DRAWINGS

FIG. 2 (A), FIG. 2 (B), FIG. 2 (C), FIG. 2 (D), FIG. 2 (E), FIG. 2 (F) and FIG. 2 (G) each represents a view of working process to show treatment on an end portion of the optical fiber cable;

FIG. 3 (A), FIG. 3 (B), FIG. 3 (C) and FIG. 3 (D) each represents a view of working process to show an example of welding operation of an optical fiber and a collimator lens, which is one of the treatment on an end portion of the optical fiber cable;

DETAILED DESCRIPTION OF THE PREFERRED EMBODIMENT

Description will be given below on the best mode for carrying out the present invention referring to the attached drawings.

Figure 1:
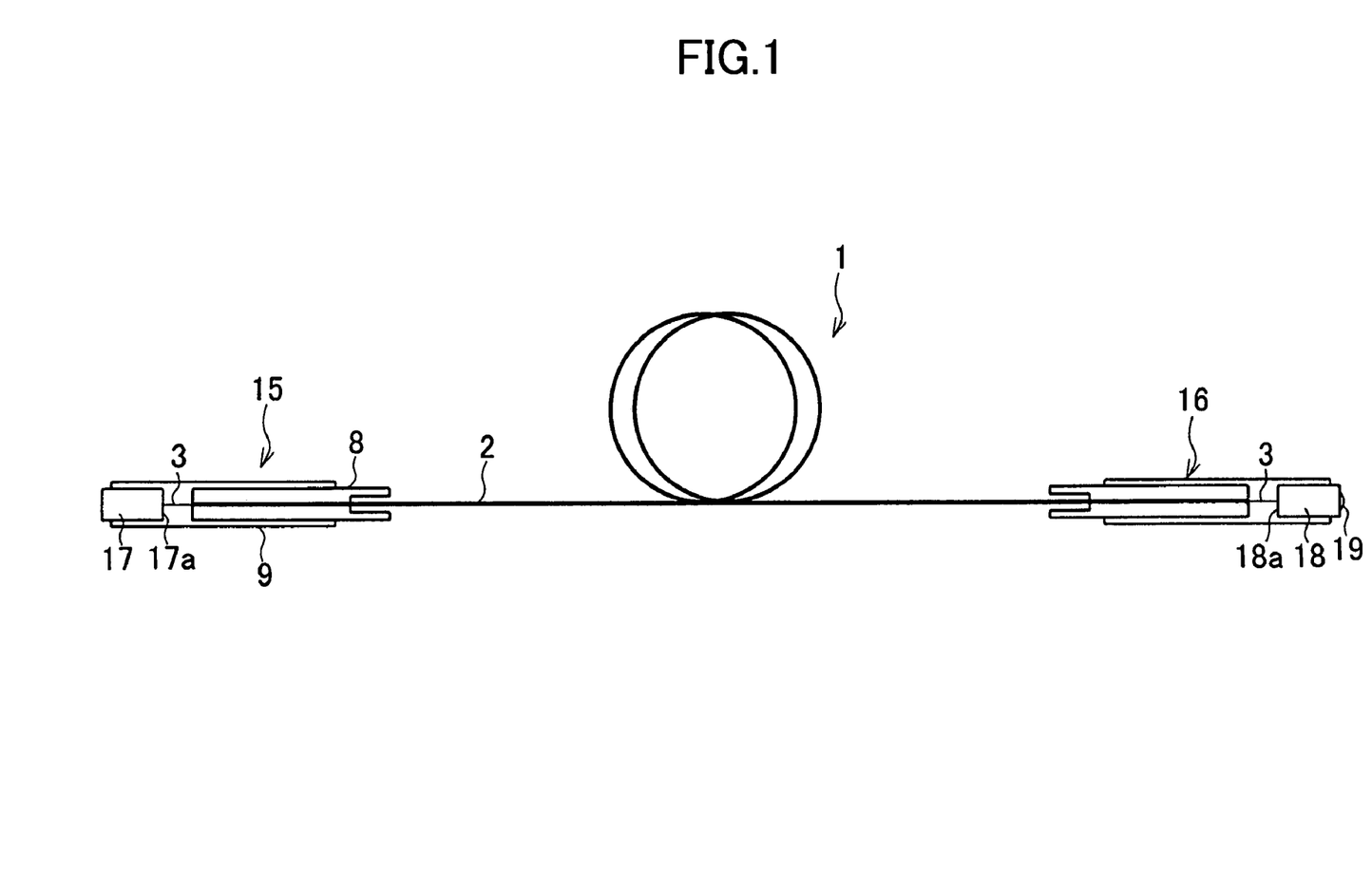
FIG. 1 is a partial sectional view of an optical fiber cable according to an embodiment of the present invention.

FIG. 1 shows an optical fiber cable according to the present invention.

In FIG. 1, the same component as shown in FIG. 5 is referred by the same symbol.

A cable main unit 2 has an arrangement similar to the arrangement shown in FIG. 6 and FIG. 7. On end portions of the cable main unit 2, terminal units 15 and 16 are mounted respectively. As a cover member of the terminal unit 15, a transparent cover glass 17 is used, which does not have an effect as a lens. As a cover member of the terminal unit 16, a transparent collimator lens 18 is used, which is provided with a lens unit 19 on an outer end surface and has an effect as a lens. Description will be given below on a case where a glass member made of quartz is used as the core 5.

Now, description will be given on the terminal units 15 and 16.

A sheath 4 on the end portion of the cable main unit 2 is removed for a certain length required by a procedure such as cleavage, and a ferrule 8 is mounted on the exposed optical fiber 3. With the ferrule 8 mounted, the optical fiber 3 pierces through the ferrule 8, and a forward end of the optical fiber 3 is protruded through the ferrule 8. The forward end of the optical fiber 3 is welded on an inner end surface 17a of the cover glass 17. A terminal unit cover 9 is fixed to stretch over and to cover the coverglass 17 and the ferrule 8. It is so arranged that a refractive index of the optical fiber 3, i.e. the core 5, is equal to or approximately equal to a refractive index of the cover glass 17.

For the terminal unit 16, too, a forward end of the optical fiber 3 is welded on an inner end surface 18a of the collimator lens 18 in a manner similar to the above, and the terminal unit cover 9 is covered and fixed. It is so arranged that a refractive index of the optical fiber 3, i.e. the core 5, is equal to or approximately equal to a refractive index of the collimator lens 18.

It is preferable that an antireflection film is provided on an outer end surface of each of the cover glass 17 and the collimator lens 18. The ferrule 8 may not be used. In this case, the forward end of portion the cable main unit 2 is fixed on the terminal unit cover 9 by such means as filling a material such as an adhesive agent between the terminal unit cover 9 and the cable main unit 2.

In the optical fiber cable 2 according to the present invention, the optical fiber 3 is directly welded on the cover glass 17 and the collimator lens 18. As a result, there is no reflection on the welded surface. Also, there is no need to polish the forward end surface of the optical fiber 3 and also no need to provide an antireflection film on the forward end surface. Further, there is no need to provide an antireflection film or to polish the inner end surface 17a of the cover glass 17 and the inner end surface 18a of the collimator lens 18.

When the terminal units 15 and 16 are attached, there is no need to perform polishing process and preparing process an antireflection film, etc., and this contributes to the reduction of the number of processes. There is no optical loss caused by reflection on the forward end surface of the optical fiber 3, the inner end surface 17a and the inner end surface 18a, and this contributes to the improvement of optical transmission efficiency of the optical fiber cable 1.

Further, the optical fiber 3 is welded on the inner end surface 18a of the collimator lens 18, which has an effect as a lens. Thus, a position of a focus point with respect to the lens unit 19 is on the inner end surface 18a. The position of the inner end surface 18a with respect to the lens unit 19 can be accurately controlled when the collimator lens 18 is manufactured. Therefore, there is no need to perform the positioning of the optical fiber 3 with the collimator lens 18 during the operation to mount the terminal unit 16, and the burden on an operator can be extensively reduced.

Referring to FIG. 2, description will be given on the processes to mount the terminal unit 15 on the cable main unit 2.

Figure 2A:
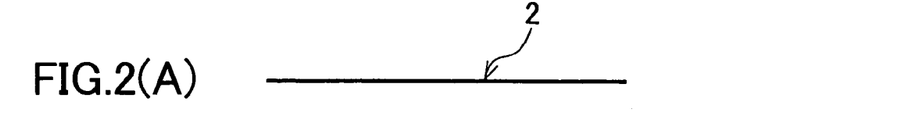
Figure 2B:
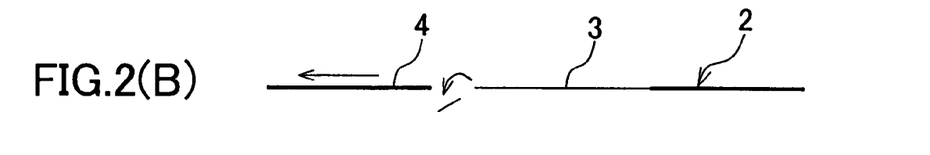
Figure 2C:
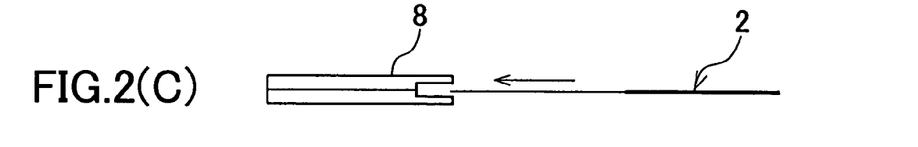

The sheath 4 is removed over a length as required on the forward end portion of the cable main unit 2. The optical fiber 3 is exposed, and the forward end of the optical fiber 3 is cleaved (FIG. 2 (B)).

The optical fiber 3 is inserted into the ferrule 8 (FIG. 2 (C)). As the material to be used as the ferrule 8, a material such as metal, glass, zirconia, etc. is selected by giving due consideration on the environment and so on where the optical fiber cable 1 is used.

Figure 2D:
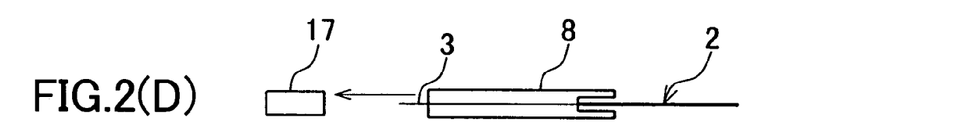

The forward end portion of the optical fiber 3 pierces through the ferrule 8, and the forward end of the optical fiber 3 is welded on the inner end surface 17a of the cover glass 17. As described later, for the welding, under such condition that the inner end surface 17a is brought closer to or brought into contact with the forward end of the optical fiber 3, plasma arc by electric discharge is generated. At least one of the inner end surface 17a and the optical fiber 3 is molten or is turned to a softened condition closer to melting. When at least one of the inner end surface 17a and the optical fiber 3 is molten or is turned to a softened condition closer to melting, a gap between the inner end surface 17a and the optical fiber 3 is filled as the result of expansion and surface tension, and welding is performed. Because the same material or almost the same material with approximately the same refractive index is selected as the cover glass 17 and the optical fiber 3 (core 5), reflection and refraction on the boundary surface can be avoided.

Figure 2E:
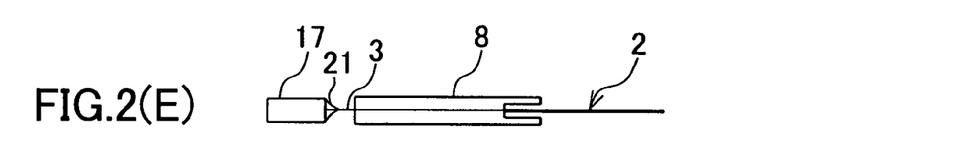
Figure 2F:
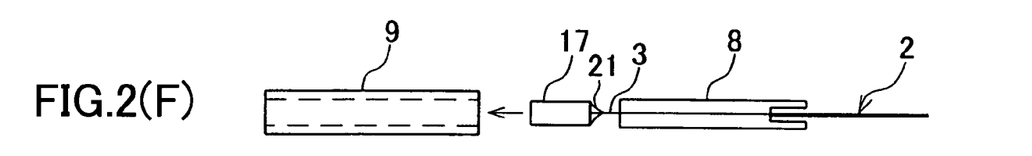
Figure 2G:
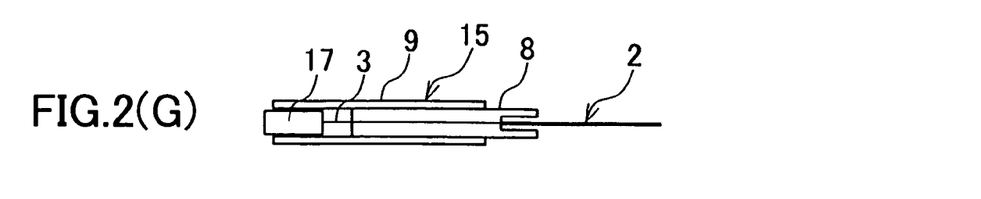

An adhesive agent 21 is filled in form of a cone around the forward end of the optical fiber 3, and the welding portion of the optical fiber 3 is strengthened. As the adhesive agent 21 for the use, various types of adhesive agent such as UV-setting type, thermosetting type, cold setting type, etc. may be used (FIG. 2 (E)).

The terminal unit cover 9 is put to stretch over the cover glass 17 and the ferrule 8, and the terminal unit cover 9 is bonded and fixed on the cover glass 17 and the ferrule 8 (FIG. 2 (F) and FIG. 2 (G)). As the material of the terminal unit cover 9, a material such as metal, glass, zirconia, etc. may be used. The material should be selected by giving due consideration on the environmental condition where the optical fiber cable 1 is used.

Detailed description is not given on the mounting of the terminal unit 16 because it is the same as the procedure described above except that the cover glass 17 is replaced by the collimator lens 18.

An example of welding of the optical fiber 3 with the cover glass 17 and the collimator lens 18 is proposed in the Japanese Patent Application 2005-191354. Referring to FIG. 3, description will be given below on an example of the welding.

FIG. 3 shows a case where the optical fiber 3 is welded on the collimator lens 18, while the same applies to the case where the optical fiber 3 is welded on the cover glass 17.

Figure 3A:
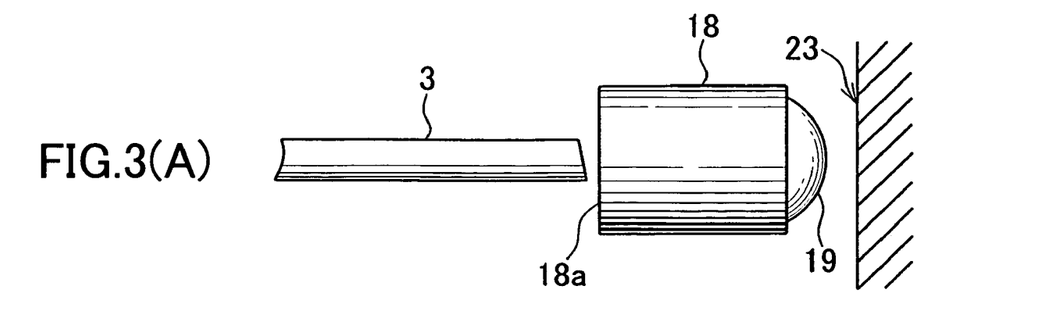

The optical fiber 3 and the collimator lens 18 are arranged on the same optical axis, and a reflection mirror 23 is disposed at a side closer to the lens unit 19 of the collimator lens 18.

The Figure shows the forward end surface of the optical fiber 3 in cleaved state. For example, the forward end surface has an inclined surface at a certain required angle (1° to 10°) with respect to the optical axis of the optical fiber 3. The forward end surface of the optical fiber 3 is not polished.

Figure 3B:
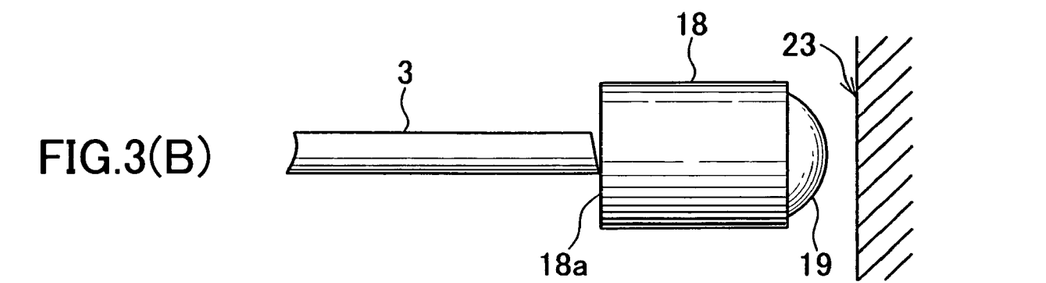

The forward end of the optical fiber 3 is brought closer to or into contact with the inner end surface 18a, and optical axis alignment is performed. In the optical axis alignment, an inspection light is projected to the collimator lens 18 from the optical fiber 3. The inspection light projected from the collimator lens 18 is reflected by the reflection mirror 23 and enters the optical fiber 3 again via the collimator lens 18. An amount of the light entering the optical fiber 3 is detected. The detected light amount reaches the maximum value when the optical axis of the optical fiber 3 is aligned with the optical axis of collimator lens 18. Thus, the positioning of the optical fiber 3 and the collimator lens 18 is performed so that the detected light amount reaches the maximum value.

Figure 3C:
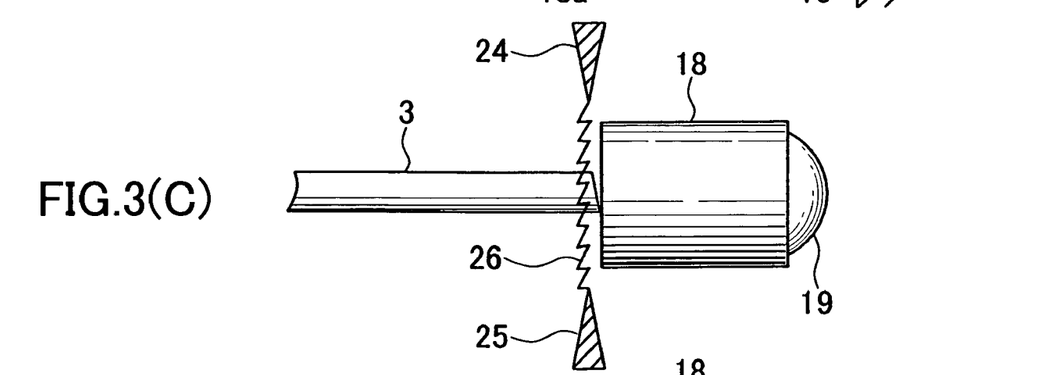

When the optical axis alignment is completed, electrodes 24 and 25 each in needle-like shape are placed opposite to each other with the forward end of the optical fiber 3 between the electrodes 24 and 25. A high voltage is applied between the electrodes, and a plasma arc 26 is generated. Due to the heating caused by the plasma arc 26, at least one of the optical fiber 3 and the collimator lens 18 is turned to a molten state or to a softened state closer to melting.

It is preferable that the collimator lens 18 with larger volume is turned to the molten state or to the softened state closer to melting. Therefore, when the optical fiber 3 (core 5) is made of quartz, as the material of the collimator lens 18, a multi-component glass of boro-silicate type is preferably used. The softening point of quartz is about 1600° C., and the softening point of the multi-component glass of boro-silicate type is 607° C.

Figure 3D:
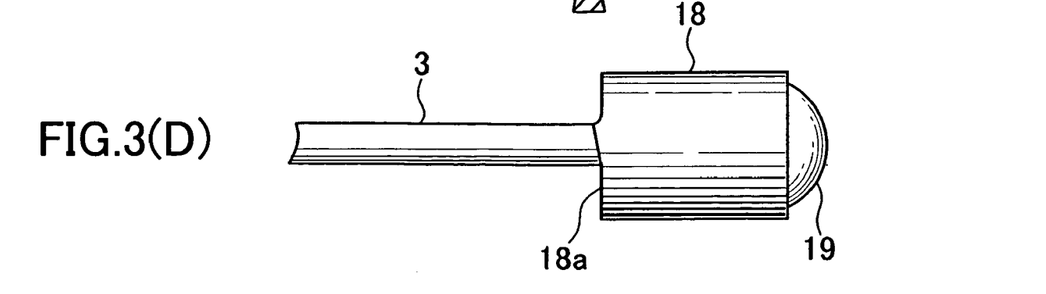

By the plasma arc 26, the collimator lens 18 is molten or softened and expanded. Due to surface tension (capillarity), the inner end surface 18a rises up to fill a gap between the forward end surface of the optical fiber 3 and the inner end surface 18a, and the optical fiber 3 and the collimator lens 18 are welded on each other. Both the optical fiber 3 and the collimator lens 18 are made of glass material of the same type. These are well adapted to each other, and welding of high quality can be accomplished.

The optical fiber 3 and the collimator lens 18 are welded on each other so that the gap between the forward end surface of the optical fiber 3 and the inner end surface 18a is filled. The forward end surface of the optical fiber 3 may have fine surface irregularities, and the forward end surface may not necessarily be inclined.

In the optical axis alignment process of the optical fiber 3 and the collimator lens 18, because of the presence of the gap between the forward end surface of the optical fiber 3 and the inner end surface 18*a*, air may be present in the gap, and the optical axis may be deviated due to the difference in the refractive index. By filling a liquid such as water, alcohol, etc. into the gap, it is possible to decrease or eliminate the deviation of the optical axis caused by the difference in the refractive index. This contributes to the improvement of accuracy in the optical axis alignment of the optical fiber 3 and the collimator lens 18.

Next, referring to FIG. 4, description will be given below on an application example of the optical fiber cable of the present invention.

A laser beam is projected from a solid-state laser device 28 to an end of the optical fiber cable 1. The optical fiber cable 1 guides the laser beam as necessary and projects the laser beam from the other end.

Figure 4:
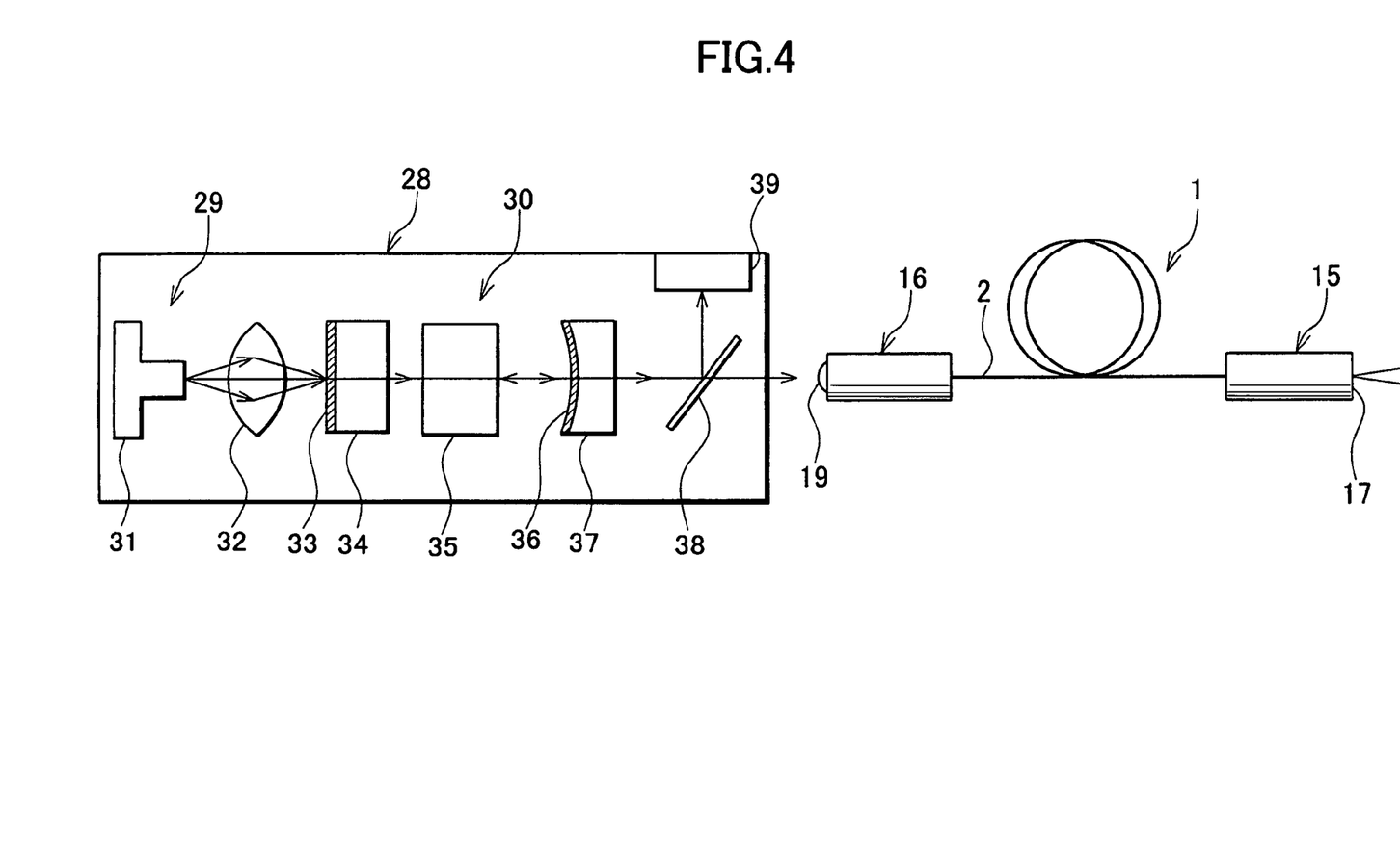
FIG. 4 is a drawing to explain a solid-state laser device for emitting a laser beam and an optical fiber cable according to the present invention.

FIG. 4 shows an LD-pumped solid-state laser device 28 of one-wavelength oscillation, which is an example of a laser oscillation device.

In FIG. 4, reference numeral 29 denotes a light emitting unit, and numeral 30 denotes an optical resonator. The light emitting unit 29 comprises an LD light emitter 31 and a condenser lens 32. Further, the optical resonator 30 comprises a first optical crystal (a laser crystal 34) where a first dielectric reflection film 33 is formed, a second optical crystal (a nonlinear optical crystal (NLO) (a wavelength conversion crystal 35)), and a concave mirror 37 where a second dielectric reflection film 36 is formed. At the optical resonator 30, the laser beam is pumped, resonated, amplified and outputted. As the laser crystal 34, Nd:YVO$_4$ is used, and KTP (KTiOPO$_4$; potassium titanyl phosphate) is used as the wavelength conversion crystal 35.

The solid-state laser device 28 is used to emit a laser beam with a wavelength of 809 nm, for instance, and the LD light emitter 31, i.e. a semiconductor laser, is used. The LD light emitter 31 has a function as a pumping light generator to generate an excitation light.

The laser crystal 34 is used for amplification of light. As the laser crystal 34, Nd:YVO$_4$ with an oscillation line of 1064 nm is used. In addition, YAG (yttrium aluminum garnet) doped with Nd$^{3+}$ ion, etc. are adopted. YAG has oscillation lines of 946 nm, 1064 nm, 1319 nm, etc. Also, Ti (Sapphire) with oscillation lines of 700 nm to 900 nm, etc. may be used.

On a side of the laser crystal 34 closer to the LD light emitter 31, the first dielectric reflection film 33 is formed. The first dielectric reflection film 33 is highly transmissive to a laser beam from the LD light emitter 31 and is highly reflective to an oscillation wavelength of the laser crystal 34. Also, the first dielectric reflection film 33 is highly reflective to second high harmonic wave (Second Harmonic Generation (SHG)).

The concave mirror 37 is so arranged that the concave mirror 37 faces toward the laser crystal 34. A side of the concave mirror 37 closer to the laser crystal 34 is designed in form of a concave spherical mirror with an adequate radius, and the second dielectric reflection film 36 is formed on the concave mirror 37. The second dielectric reflection film 36 is highly reflective to an oscillation wavelength of the laser crystal 34, and it is highly transmissive to the second high harmonic wave.

As described above, when the first dielectric reflection film 33 of the laser crystal 34 is combined with the second dielectric reflection film 36 of the concave mirror 37, and when the laser beam from the LD light emitter 31 is projected to the optical resonator 30 via the condenser lens 32 and the laser beam is pumped by the optical resonator 30, the light can be confined for long time. Thus, the light can be resonated and amplified.

The wavelength conversion crystal 35 is placed in the optical resonator, which comprises the first dielectric reflection film 33 of the laser crystal 34 and the concave mirror 37. By the wavelength conversion crystal 35, the second harmonic wave (second harmonic generation) is generated, which has optical frequency as high as two times. From the optical resonator 30, a laser beam with a wavelength of 532 nm is emitted.

A part of the projected laser beam is split by a half-mirror 38 and is inputted to a photodetection element 39, and light emission intensity of the LD light emitter 30 is controlled so that photodetection intensity at the photodetection element 39 is kept to a constant value.

The laser beam, which is emitted from the solid-state laser device 28 and is amplified, is inputted to the terminal unit 16 of the optical fiber cable 1 and is converged to an incident end of the cable main unit 2 by the lens unit 19 of the terminal unit 16. The laser beam transmitted through the cable main unit 2 is projected from the terminal unit 15 on the other end. In case the laser beam projected from the terminal unit 15 must be parallel luminous fluxes, the terminal unit 16 with the lens unit 19 is used. In the figure, the cover glass 17 with no lens effect is used.

On the terminal unit 15 to be used as a projection end, if diffused light, parallel light or splitting of a luminous flux, or scattering light, etc. is required as a projection light, an optical member to match the required projection light such as a concave lens, a convex lens, a diffraction grating, etc. is mounted instead of the cover glass 17.

What is claimed is:

1. An optical fiber cable, comprising a cable main unit with an optical fiber covered by a sheath and terminal units mounted on end portions of said cable main unit, wherein each of said terminal units has a transparent cover member with a refractive index approximately equal to said optical fiber and has a ferrule, wherein said sheath is removed for a required length with respect to at least one of the end portions of said cable main unit and said optical fiber is exposed, the exposed optical fiber is inserted into said ferrule, an end surface of said optical fiber which pierces through said ferrule is welded on said cover member, and said cover member and said optical fiber are integrated with each other.

2. An optical fiber cable according to claim 1, wherein said cover member is covered by a terminal unit cover, and said cable main unit and said cover member are fixed by said terminal unit cover.

3. An optical fiber cable according to claim 2, wherein said terminal unit cover is stretched over to cover said cover member and said ferrule.

4. An optical fiber cable according to claim 1, wherein a forward end surface of said optical fiber to be welded is a cleaved surface.

5. An optical fiber cable according to claim 1, wherein a portion around a forward end of said optical fiber being welded is strengthened by using an adhesive agent.

6. An optical fiber cable according to claim 1, wherein said optical fiber and said cover member have different softening points and different melting points, the softening point and the melting point of said cover member are lower than the softening point and the melting point of said optical fiber, and welding are performed by softening and melting said cover member.

7. An optical fiber cable according to claim 1, wherein an input end surface of said cover member is designed in form of a lens to refract an input light and guides said input light directly toward said optical fiber.

8. An optical fiber cable according to claim 1, wherein a diffraction grating is provided on an output end surface of said cover member to diffract an output light.

9. An optical fiber cable according to claim 1, wherein said cover member is a member selected from the group consisting of cover glass, a collimator lens, a convex lens and a concave lens.

* * * * *